(12) United States Patent
Altman et al.

(10) Patent No.: US 11,639,176 B2
(45) Date of Patent: May 2, 2023

(54) METHOD, SYSTEM, AND APPARATUS FOR MEASURING THE DEPTH OF A BODY OF WATER AHEAD OF THE USER'S POSITION/LOCATION

(71) Applicants: Shlomo Altman, Houston, TX (US); Rachel Altman, Houston, TX (US)

(72) Inventors: Shlomo Altman, Houston, TX (US); Rachel Altman, Houston, TX (US)

( * ) Notice: Subject to any disclaimer, the term of this patent is extended or adjusted under 35 U.S.C. 154(b) by 232 days.

(21) Appl. No.: 17/093,587

(22) Filed: Nov. 9, 2020

(65) Prior Publication Data
US 2021/0171043 A1    Jun. 10, 2021

Related U.S. Application Data

(60) Provisional application No. 62/933,403, filed on Nov. 9, 2019.

(51) Int. Cl.
| | |
|---|---|
| *B60W 40/06* | (2012.01) |
| *B60W 50/14* | (2020.01) |
| *G01C 13/00* | (2006.01) |
| *G01S 11/14* | (2006.01) |
| *G01S 13/931* | (2020.01) |

(52) U.S. Cl.
CPC .......... *B60W 40/06* (2013.01); *B60W 50/14* (2013.01); *G01C 13/008* (2013.01); *G01S 11/14* (2013.01); *B60W 2050/146* (2013.01); *B60W 2552/00* (2020.02)

(58) Field of Classification Search
CPC ........... B60W 40/06; B60W 50/14; B60W 2050/146; B60W 2552/00; B60W 2420/00; B60W 2422/00; B60W 2422/95; G01C 13/008; G01S 11/14; G01S 13/931; G01S 15/931; G01S 17/87; G01S 17/931; G01S 13/862; G01S 13/865; G01S 2013/9323; G01S 2013/9324; G01S 2013/93271; G01S 2015/937; G01S 13/88; G01S 15/04; G01S 15/87; G01S 15/88; G01S 17/88
See application file for complete search history.

(56) References Cited

U.S. PATENT DOCUMENTS 9,026,310 B2 *   5/2015   Tran ................. B60G 17/01908
                                                     367/908
9,227,479 B2     1/2016   Clarke et al.
(Continued)

FOREIGN PATENT DOCUMENTS

GB           2504932 A       8/2012

*Primary Examiner* — Frederick M Brushaber
(74) *Attorney, Agent, or Firm* — Katz Law Group, LLC; Gary P. Katz

(57) ABSTRACT

This application describes a method, system, and apparatus for measuring the depth of a body of water ahead of the user's location or position. The user can be a driver of a vehicle. The apparatus includes a fording depth sensor, a second fording depth sensor, a proximity sensor to determine road angle or position ahead of the vehicle, wherein the proximity sensor is designed to operate underneath the water surface and a control unit configured to use signals of the wading depth and sensors to compute a wading depth at a location ahead of the direction of vehicle movement and/or to compute a distance ahead of the direction of vehicle movement to maximum wading depth. A method of building the apparatus, system, and vehicle is also provided.

20 Claims, 13 Drawing Sheets

(56) References Cited

U.S. PATENT DOCUMENTS

| | | | |
|---|---|---|---|
| 9,291,491 B2 * | 3/2016 | Tran | G01F 23/00 |
| 9,302,586 B2 | 4/2016 | Tran et al. | |
| 9,358,983 B2 | 6/2016 | Gilling et al. | |
| 9,399,473 B2 | 7/2016 | Hoare et al. | |
| 9,597,961 B2 | 3/2017 | Tran et al. | |
| 9,637,132 B2 | 5/2017 | Clarke et al. | |
| 9,714,038 B1 | 7/2017 | He | |
| 9,821,659 B2 | 11/2017 | Tran et al. | |
| 9,827,853 B2 | 11/2017 | Tran et al. | |
| 9,975,499 B2 | 5/2018 | Popham et al. | |
| 10,183,659 B2 * | 1/2019 | Mills | B60W 10/184 |
| 2014/0324288 A1 * | 10/2014 | Tran | G01S 15/87 |
| | | | 701/37 |
| 2018/0215381 A1 * | 8/2018 | Owen | B60W 40/06 |
| 2019/0077406 A1 * | 3/2019 | Dudar | B60W 40/06 |

* cited by examiner

METHOD, SYSTEM, AND APPARATUS FOR MEASURING THE DEPTH OF A BODY OF WATER AHEAD OF THE USER'S POSITION/LOCATION

CROSS REFERENCE TO RELATED APPLICATIONS

The present application is a United States Non-Provisional patent Application that claims priority to U.S. Patent Application Ser. No. 62/933,403, entitled "A Method, System, and Apparatus for measuring the depth of a body of water ahead of the user's position/location filed on Nov. 9, 2019, which is incorporated in its entirety by reference

FIELD

Embodiments of the invention relate to a method, to a system, to a vehicle, and a program involving vehicles. More specifically, embodiments of the invention relate to a method, to a system, to a vehicle, and a program, of operating an apparatus used in a vehicle to provide information about the level of water relative to the exterior of the vehicle when fording.

BACKGROUND

Driving through standing water can damage a vehicle's engine, cause the brake rotors to warp from rapid cooling when immersed in water, cause loss of power steering, and short electrical components in a vehicle. Automobiles including cars and other vehicles can only travel through a body of water up to a finite depth. This depth is often referred to as a maximum wading or fording depth. Once this fording depth is exceeded, there is a significant risk that the vehicle engine and electronics may be damaged.

Off-road vehicles such as Jeeps™ are typically designed to have the ability to wade through water at a greater depth than conventional vehicles. Furthermore, the maximum wading depth may differ from vehicle to vehicle.

The maximum fording depth also relates to the skill of the driver. Before fording, it is recommended for the operator to make an assessment of water depth and underwater terrain on foot or use measurements found on roads prone to flooding. Impatience by the operator of a vehicle may result in an attempted traverse by the vehicle without taking adequate precautions. On-board measurement of the depth of the water whilst fording may be an asset to the driver. An estimation or measurement of water depth some distance in front of the vehicle may also be an advantage, giving the driver advance indication of future immersion depth and information about an immersion limit.

In the past, the absolute measurement of water depth some distance in front of the vehicle by remote means was difficult and expensive. Therefore, current technology provides an estimation of water depth which while useful may mislead the driver or not provide enough information. Accordingly, is a need to provide accurate measurements of water depth in front of the vehicle. Embodiments of the present invention discussed below, satisfy these needs.

SUMMARY

In one embodiment, the present disclosure is directed to a method for measuring the depth of a body of water ahead of the user's or vehicles' location. This method comprises several steps. Frist, a signal is received from at least three sensors, at least two types of sensors at a first sensor location, wherein a portion of the at least three sensors are located on the front half of the vehicle indicating the presence of water, first water fording depth at the first sensor location on the vehicle, and proximity sensor to determine the distance to road ahead of the vehicle, wherein the proximity sensor is designed to operate underneath the water surface. Next, a signal is received from a second sensor indicating second water fording depth at the second location on the vehicle to determine the attitude of the vehicle/apparatus in relation to the above water surface and the distance to the road ahead. Finally, the angle between the first current water fording and the second current water fording depth, the attitude of the vehicle in relation to the surface of the water and the distance to the road ahead and a distance in advance of the location of the vehicle and/or a maximum wading depth of the vehicle, a depth of water at a location ahead of the vehicle substantially in the direction of vehicle movement and/or the distance, ahead of the vehicle substantially in the direction of vehicle movement is compared to determine future maximum wading depth.

In the second embodiment, the present disclosure is further directed to a vehicle. The vehicle comprises a fording depth sensor, a second fording depth sensor, a proximity sensor to determine road distance or position ahead of the vehicle, wherein the proximity sensor is designed to operate underneath the water surface, and a control unit configured to use signals of the wading depth and sensors to compute a wading depth at a location ahead of the direction of vehicle movement and/or to compute a distance ahead of the direction of vehicle movement to maximum wading depth.

In a third embodiment, the present disclosure is further directed to a system for a vehicle. The system comprising: a control unit, fording depth sensor, a second fording depth sensor to determine the angle in water and angle relating to the proximity sensor, a proximity sensor to determine road angle ahead of the vehicle, wherein the control unit is configured to detect and/or calculate wading depth in advance of a location of a vehicle and/or configured to estimate a maximum range of a vehicle in advance of a location of a vehicle, wherein the calculations/detections are based upon a wading depth as determined by the sensor for indicating wading depth, tilt as determined by comparing the water level sensors and a distance in advance of the location of the vehicle and/or a maximum wading depth of the vehicle, wherein the proximity sensor is designed to operate underneath the water surface.

The foregoing is intended to give a general idea of the invention and is not intended to fully define nor limit the invention. The invention will be more fully understood and better appreciated by reference to the following description and drawings.

BRIEF DESCRIPTION OF THE DRAWINGS

In the detailed description of various embodiments usable within the scope of the present disclosure, presented below, reference is made to the accompanying drawings, in which.

One or more embodiments are described below with reference to the listed Figures.

DETAILED DESCRIPTION OF THE EMBODIMENTS

Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention. For example, the terms user and vehicle can be used interchangeably. As well, it should be understood that the drawings are intended to illustrate and disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the embodiments and claims in this application. Moreover, it will be understood that various directions such as "upper", "lower", "bottom", "top", "left", "right", "first", "second" and so forth are made only with respect to the explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1A:
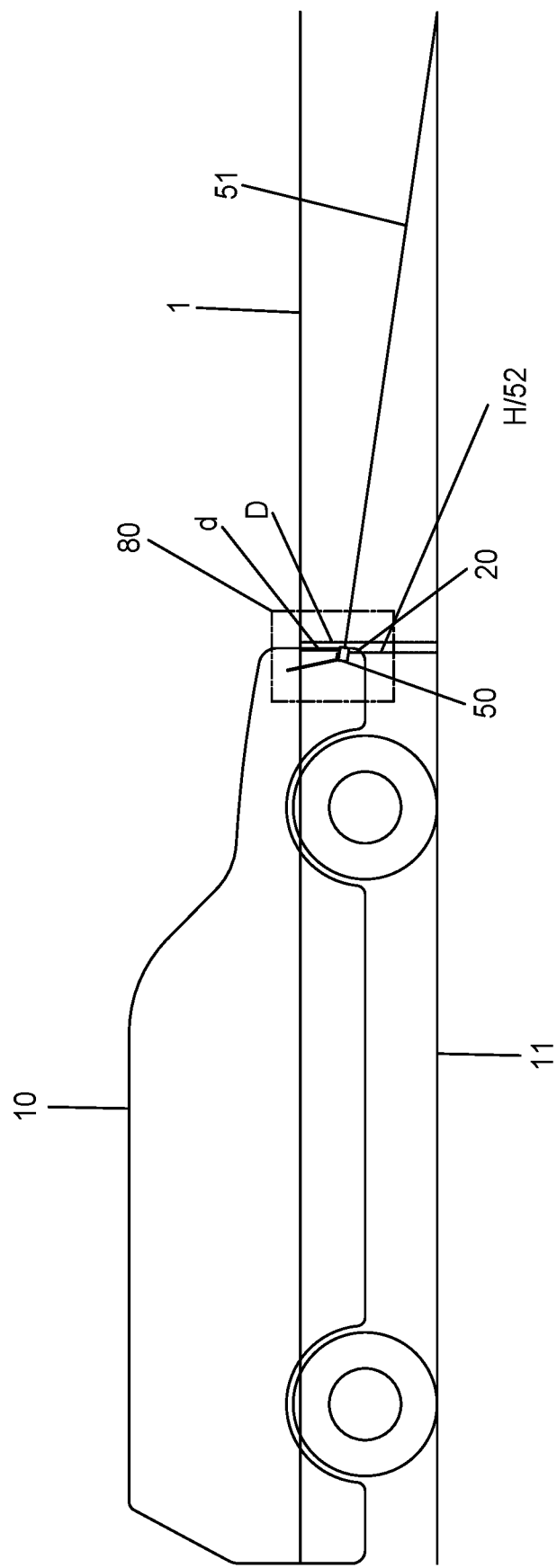
FIG. 1A is a schematic illustration of a vehicle having a system for detecting fording depth, using a substantially downward and outward-facing ultrasonic transmitter and receiver and two water level sensors underneath the surface of the water.
Figure 1B:
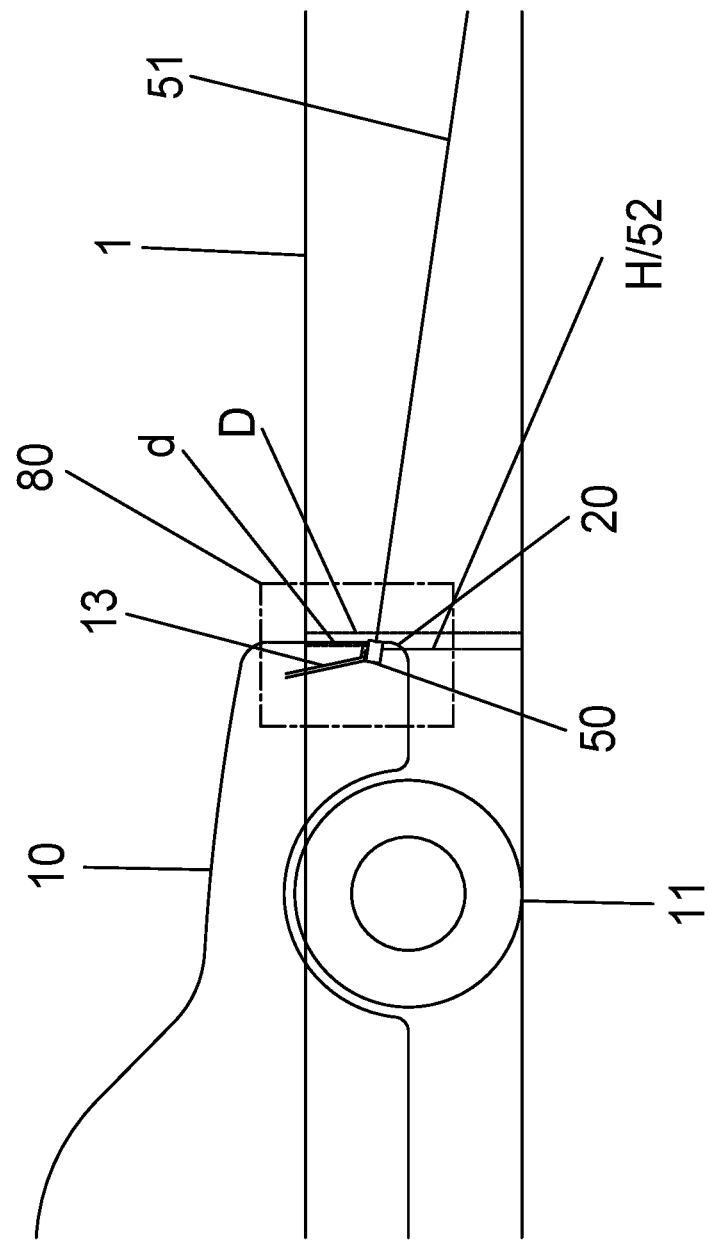
FIG. 1B is a schematic illustration of a vehicle having a system for indicating that a vehicle is in a fording situation and for detecting and/or calculating a fording depth, using a substantially downward and outward-facing ultrasonic transmitter and receiver and two water level sensors underneath the surface of the water.

Referring firstly to FIG. 1A and then FIG. 1B which are illustrations of a vehicle 10 having a system 80 for calculating the depth of water in which the vehicle 10 is fording. A system 80, as illustrated in FIG. 1A, may optionally comprise a partially or substantially downward and outward-facing sensor 50 underneath the surface of water 1 that may optionally comprise a signal emitter and a signal receiver (for example a transducer). The system 80 also comprises a control unit, which can utilize the software 110 flowchart in FIG. 11 configured to monitor electrical signals transmitted and received by the three or more sensors 50. Further, and optionally, the sensor 50 may be an ultrasonic transducer capable of emitting and receiving pulses of ultrasound.

The control unit may be configured to at least receive electrical signals issued by the sensor 50 and process them. The control unit may additionally be configured to issue electrical signals to the sensor 50 to control it. Optionally the system 80 may comprise more than three sensors 50. The sensor 50 may optionally be or include transducers (that can optionally convert acoustic signals to electrical signals and vice versa) that may preferably, but optionally, be ultrasonic transducers. Three sensors 50 may be provided on the front of the vehicle 10 and another three sensors 50 may be provided on the rear of the vehicle 10. Whereas it is advantageous to position the sensor 50 at a leading edge of vehicle 10 and at the lowest point possible to obtain the earliest measurement of fording depth, it is also envisaged that in other embodiments of the invention the system may comprise additional sensors. It will be understood that a greater number of sensors groups 50 may be used in other embodiments, as described below including 10 or more sensors.

The arrangement of the three or more sensors 50 may be used to provide additional information about the topography of the surface 11 upon which the vehicle 10 is driving. In other embodiments, the three or more sensors 50 may be arranged in a non-linear configuration and/or may be positioned at more than one height about the vehicle 10; and/or may be disguised or occluded from normal view for stylistic and/or other purposes. In use, the three or more sensors 50 are preferably downward-facing, but may be moveable from a stowed position into a use position where they are substantially downward facing.

Furthermore, whereas the present embodiment is described as utilizing ultrasonic transducers it will be understood from reading the foregoing that other suitable types of sensor or transducer may be used in alternative envisaged embodiments. For example, other ranges of acoustic transducer sensor such as an audible sound wave transducer may be used. It will be understood that other types of sensors may be suitable in replacement of or in conjunction with an ultrasonic sensor, for example, other acoustic, but non-ultrasonic sensors, an electromagnetic sensor optionally utilizing an LED for the emission of an infra-red signal, and a photodiode for receiving a portion of the infra-red signal reflected from a surface.

The terms ultrasound and ultrasonic are used synonymously in the foregoing to mean sound waves or acoustic signals or sonar of a frequency that is outside of the typical human hearing range, optionally taken to be greater than 20 kHz and further approximately 50 kHz, or within ten percent of 50 kHz. It will be understood that the present invention may be effectively employed using sonic sensors that emit and receive sound waves at frequencies lower than 20 kHz.

FIG. 1B illustrates schematically the vehicle 10 having a bumper 20 or front grill that is mounted with a downward and outward or forward-facing ultrasonic transducer sensor 50. The sensor 50 in FIG. 1B and the sensor 50 in FIG. 1A are each configured to emit a signal 51 or pulse of ultrasound and detect an echo of that signal. The echo is a reflection of the signal 51 from a nearby surface and the time of flight of the signal to the surface and back can be used to calculate a distance d, between the sensor 50 and the surface 1, which may be the surface of the water in which the vehicle 10 is fording.

The mounting height or in-use height H, 52 of the sensor 50 is a known parameter and may be stored in a memory associated with the control unit of the system 80. The control unit, knowing the mounting height or in-use height 52, H of the sensor 50 and the distance d between that sensor and water surface 1.

A look-up table may give a mounting height or in-use height associated with a vehicle suspension height setting (referred to as a ride height). A test mode may be provided for calibrating the mounting height on dry land, notwithstanding that the sensor 50 optionally may only be enabled whilst the vehicle is in a fording situation. Optionally, the control unit may determine, in real-time, the in-use position of the sensor 50 by adjusting, a normal value of the mounted height, by a correction for the ride height of the vehicle.

Figure 2:
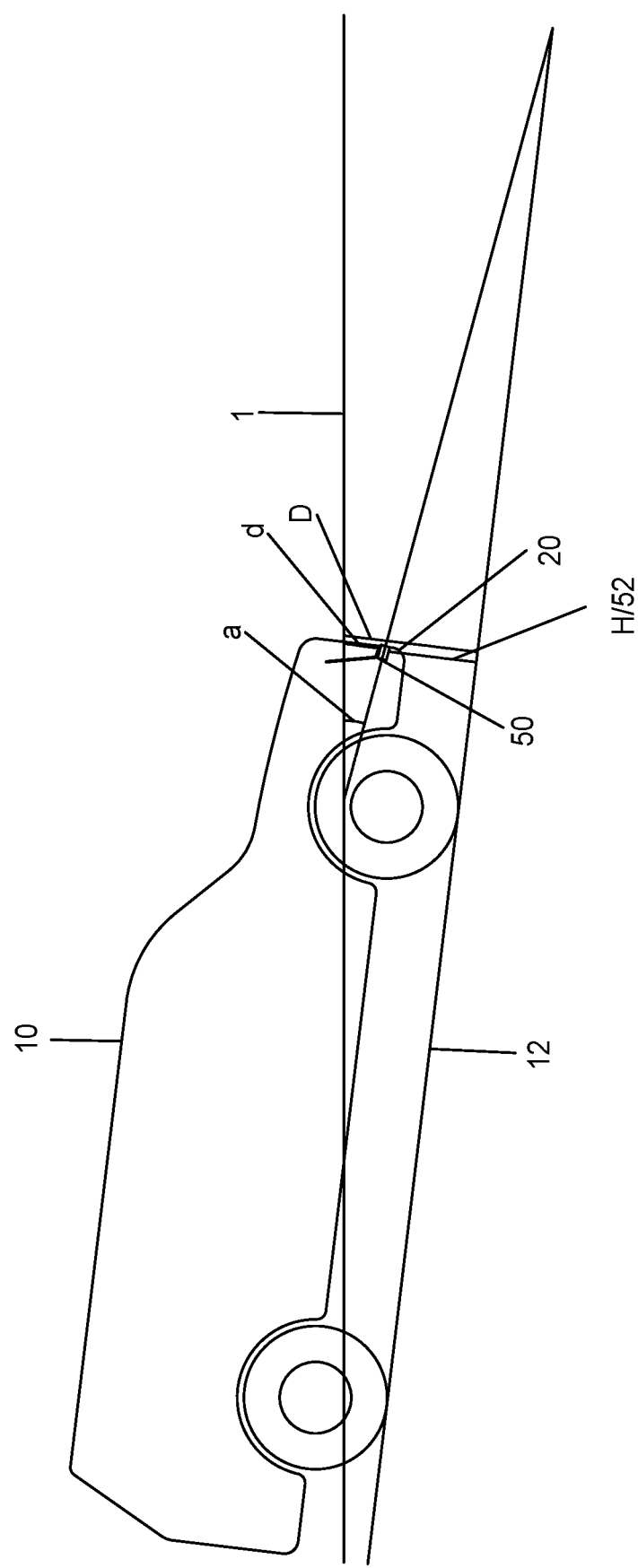
FIG. 2 is a schematic illustration of a vehicle having a system for detection and calculation of the depth of water in which the vehicle is positioned, using information about the attitude or inclination of the vehicle in water and utilizing a substantially downward and outward-facing sensor and two water level sensors underneath the surface of the water.
Figure 6:
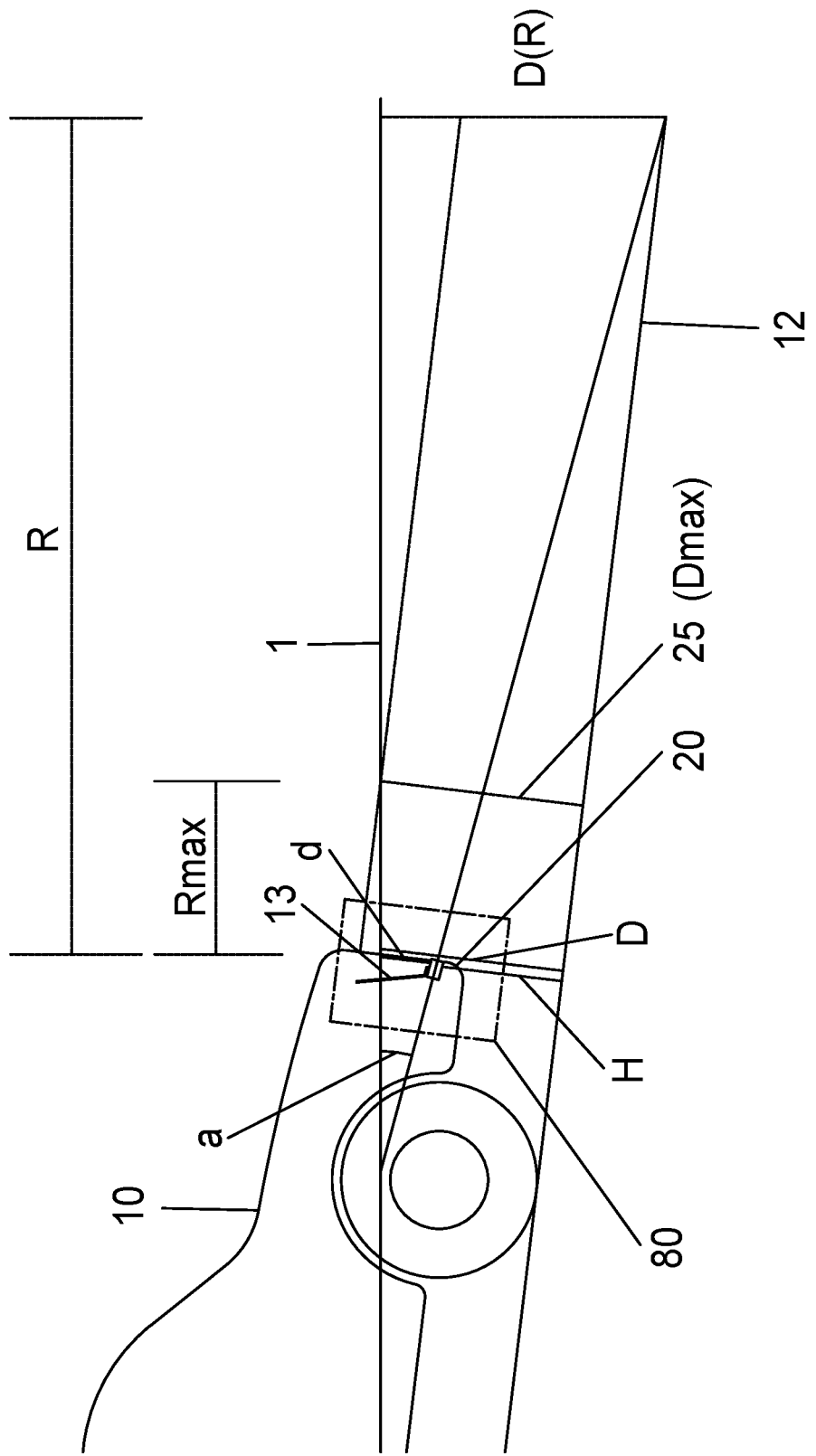
FIG. 6 is a schematic illustration of a vehicle having a system for calculating the depth of water in which the vehicle is positioned, using information about the attitude or inclination of the vehicle in relation to the surface of the water and utilizing a substantially downward and outward-facing proximity sensor.

In FIG. 1B, two parallel fording event indicator sensors, 13 are disposed on the vehicle 10. It is desirable for the fording event indicator sensors 13 to be mounted as low as possible so that an earlier indication of the presence of water in the path of vehicle 10 can be given. According to an optional aspect, the fording event indicator sensor 13 may be an ultrasonic sensor, optionally disposed on the front bumper 20, and may exhibit a change in response. when entering the water, and thus may provide an indication of the vehicle being in a fording situation. FIG. 2 and FIG. 6 illustrate a vehicle 10 on an inclined surface 12 and entering water having a surface 1.

The system comprises a plurality of water level sensors that indicate the height of the water by determining how much of the water sensors are submerged in the body of water.

FIG. 6 illustrates a vehicle 10, not level, but on an incline 12. Information, optionally from comparing the two-water level sensors 13 may provide vehicle inclination, which is a significant improvement over the prior art which provides a correction because inclination, even when the vehicle is straight, is a primary part of calculating depth ahead. It will be understood that the format of an algorithm used to carry out the computations required may be varied to accommodate various programming languages and other requirements; as such the implementation of various aspects of the invention may be done in many and various ways.

Figure 3:
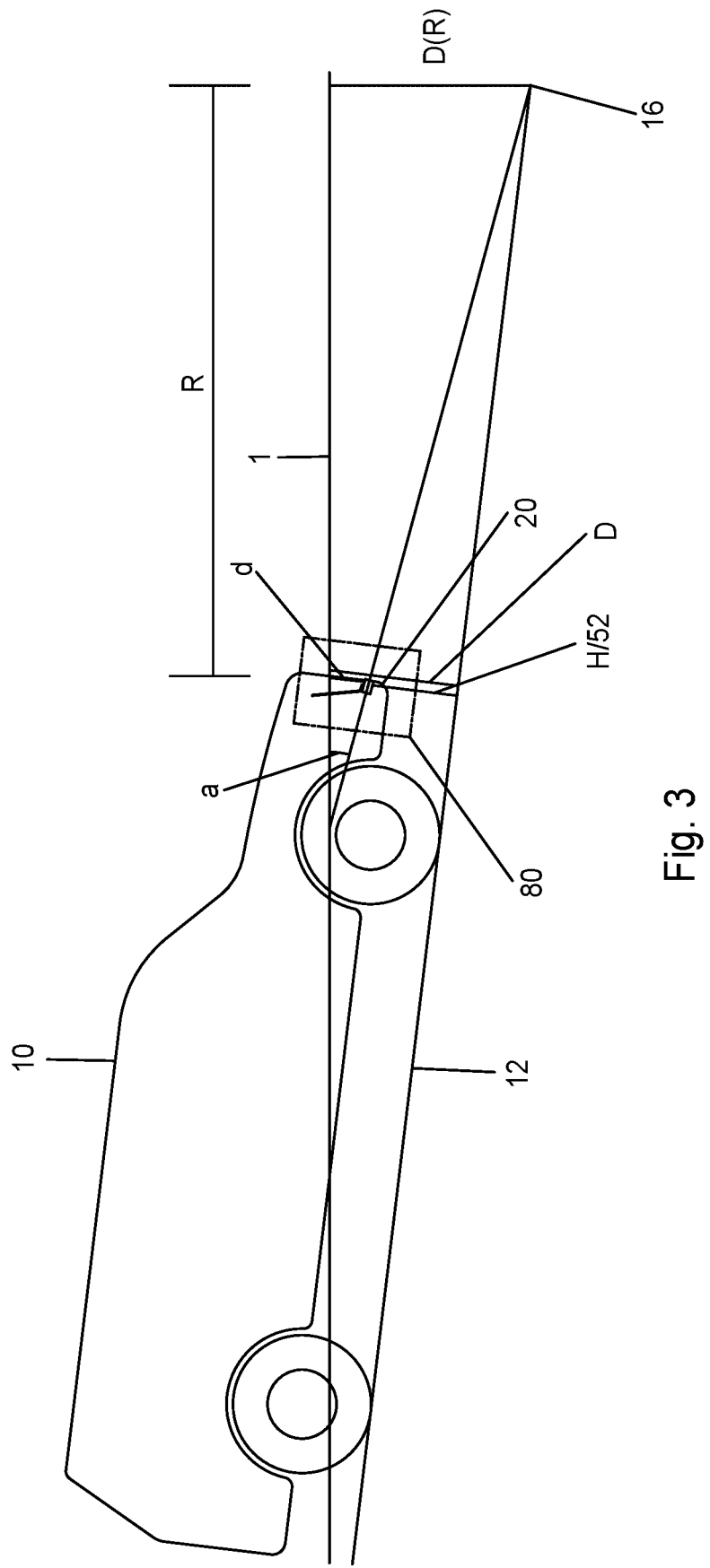
FIG. 3 is a schematic illustration of a vehicle having a system for indicating that a vehicle is in a fording situation and for calculating the depth of water ahead of the vehicle using information about the attitude or inclination of the vehicle in relation to water from a submerged position in the water.

Referring now to FIG. 3, it is illustrated how a system 80 installed on vehicle 10 is configured to and can be used to both accurately detect and accurately calculate water depth at a partially or substantially horizontal distance R ahead of vehicle 10. The calculation or of depth ahead of the vehicle 10 indication sensor 13 that the vehicle 10 is in water. As such an early prediction of ahead depth may be made using the height of the fording event indication sensor 13 as a calculation of the current water depth and the following equation:

Wherein, H is the mounting height or in-use height of a downward-facing sensor 50. It will be appreciated that the value of H may be fixed in relation to actual sensor height above ground in the horizontal vehicle condition, or according to a vehicle suspension height setting. A more accurate calculation of H utilizes vehicle inclination, a or a, to give the true vertical dimension when the vehicle is inclined. Further optionally, and with reference to FIG. 3, the following equation may be used to calculate a depth of water (or other liquid such as muddy water) D(R), at a horizontal distance R ahead of the current vehicle 10 position using a more accurate estimation of the depth of water D that the vehicle 10 is currently in (as calculated above, for example, see FIG. 2 and FIG. 6).

Where the calculated depth is at the point of calculation 16, which may for example be 1 meter; a is the angle of inclination; and D is the depth of water that the vehicle 10 is already in. D may be calculated as described above.

Whereas, in an optional embodiment of the system 80, the calculation may be updated in real-time using a real-time signal feed of measured inclination angle a.

Figure 4:
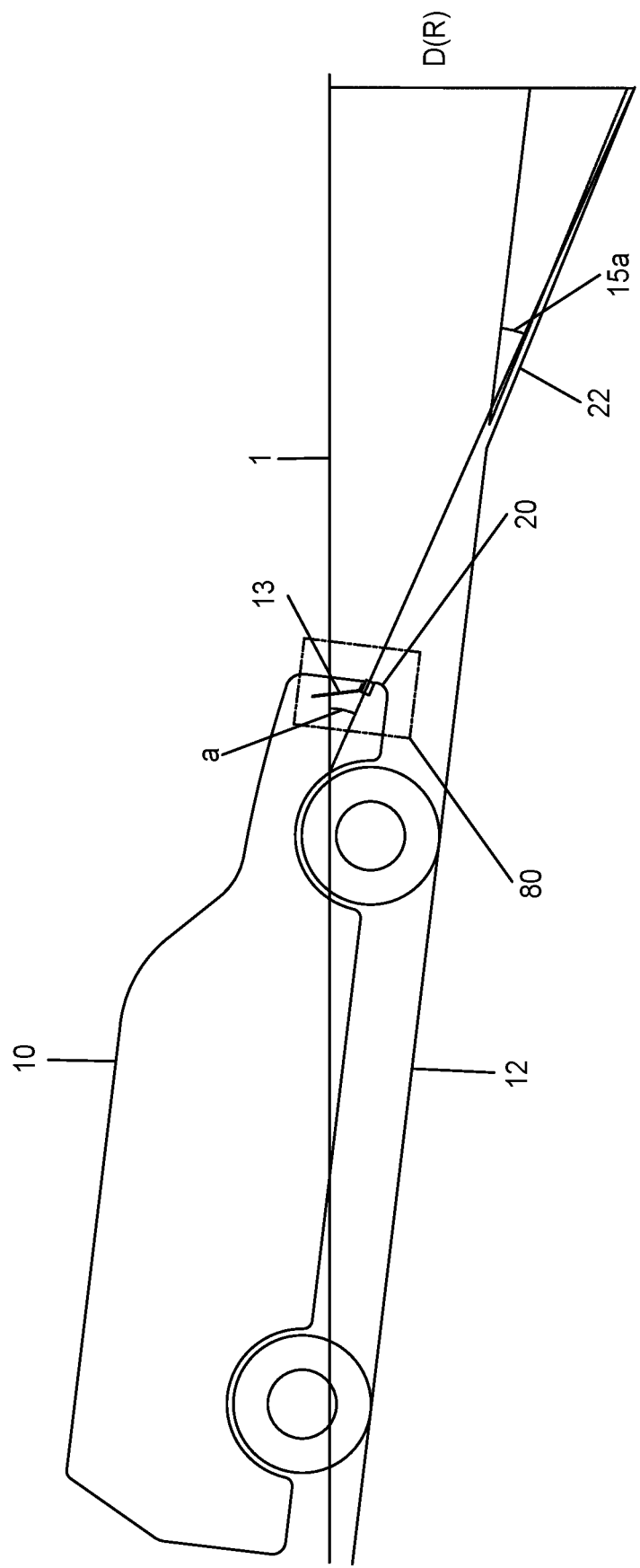
FIG. 4 illustrates the vehicle and system of FIG. 3 in a situation where there is a variation of the slope of inclination of the ground surface 12 upon which the vehicle is traveling showing the downward and outward-facing transmitter and receivers wave reaching and detecting the slope before the vehicle
Figure 5:
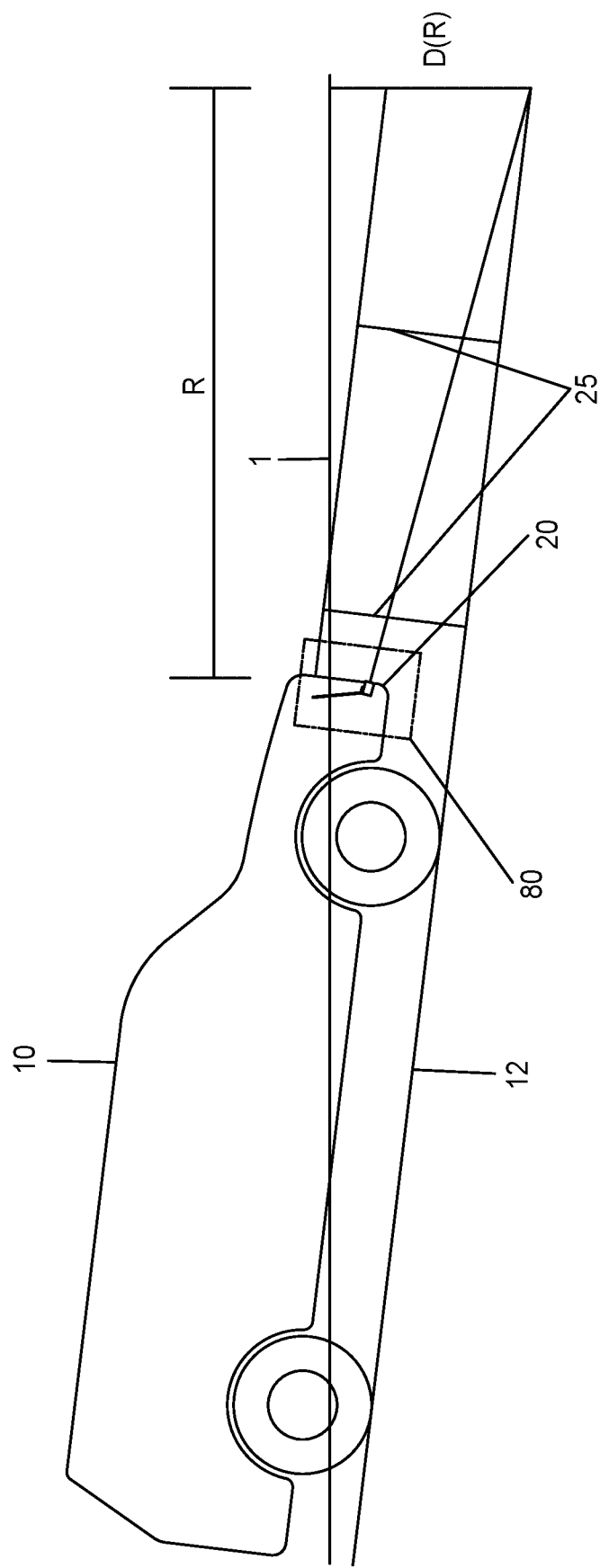
FIG. 5 illustrates a system comprising a sensor for use in calculating a maximum distance that the vehicle may be able to travel based upon a maximum fording depth of the vehicle.

FIG. 4 illustrates an embodiment where the angle of inclination increases in the forward path of the vehicle to angle 15a, giving an increased slope 22. The control system of vehicle 10 may monitor a change in the angle of inclination ahead by monitoring the distance from an underwater proximity sensor 50, shown in FIG. 2, to indicate an increasing slope. By the system 80 repeatedly conducting detection of the ahead range of the vehicle (either recalculating when a change happens or intermittently recalculating when a is measured) more accurate. FIG. 5 illustrates a vehicle 10, having a system 80 for indicating wading depth D(R) some horizontal distance R ahead of the vehicle, shown in relation to the vehicle's maximum wading depth 25. Any suitable device may be used, preferably, a bumper-mounted downward and forward-facing ultrasonic sensor and two water level sensors are utilized.

Continual measurement of actual immersion depth D may be made and compared with a maximum fording depth Dmax of the vehicle 10. Depth calculation D(R) ahead of vehicle 10 may be carried out for single distance R ahead of the vehicle, for example, 1 meter (m), or at several discrete points, for example, 50 points at 100 millimeters (mm) intervals. Alternatively, or additionally, the system 80 may be configured to estimate a distance Rmax ahead of the vehicle at which it is calculated the maximum fording depth Dmax may be reached.

The distance to maximum fording depth may be presented to the driver in the form of a dashboard warning in analog or digital form. Information, data, or signals from any of the sensors, 13, 50 concerning water presence, water depth, and tilt angle may be transmitted to a control unit or processor 121 of the system 80 by a vehicle Bus system and/or via a vehicle controller area network (CAN).

The system 80 may be provided with a water surface sensor 50 and/or one or more water indication sensors 13 on the rear of the vehicle 10 and as such the described detection of fording; detection of current fording depth and prediction of ahead fording depth may equally to forwards and reverse vehicle 10 movement, optionally using sensors at the leading edge of the vehicle. A downward and forward-facing ultrasonic sensor 50 may be provided at the front of the vehicle, for example centrally in the radiator grill or on the trunk area, or optionally on the side of the vehicle, provided that it has an output cone projecting beyond the vehicle front or rear wheels. Thus, a sensor may be provided at the side and/or within the external body panels so long as a clear forward and downward line of sight is maintained. The height H, 52 of the depth measurement sensor 50, in FIG. 1A may be determined by vehicle body design and the maximum fording depth for which the sensor is intended to be operable.

It is envisaged that in other embodiments, the system 80 may comprise three or more sensors 50. In the foregoing, the term downward and outward has been used to describe an optional position or orientation of the sensor 50. It will be understood that downward and outward may mean perfectly normal, substantially normal, within about 0 to about 20° off normal. The fording depth sensor may be activated automatically, or on-demand by the driver. A driver override may be provided.

The system of fording and/or depth sensing may be operational only below a predetermined fording speed, and the vehicle speed may be limited to a pre-set maximum during fording. It will be understood from the foregoing that the system 80 and its control unit may calculate, approximate, or predict a depth of water in which the vehicle is fording or may wade in several ways.

Exemplary calculations have been described, however, it is envisaged that many and various other ways for approximating or determining current or ahead fording depth will be suitable for use by a system 80 according to the invention. For example, any of the trigonometric functions mentioned in the above equations may be approximated by a fixed value or a series expansion may be computed to determine the value (such as a Taylor or Euler Series Expansion); further, optionally, predefined values for each or any suitable term in the above-described relationships may be listed in a look-up table (if appropriate) to be referenced during the computation of an estimation of fording depth. Additionally, or in combination, any of the trigonometric functions may be substituted to simplify the computation (and thereby optionally reduce the processing time needed to compute the compensation). It is envisaged that any of the trigonometric functions listed in the above equations may be computed by using an expansion series such as a Taylor Expansion Series or if appropriate an Euler Expansion Series and/or predetermined and listed in a reference or look-up table.

The values, if provided in a look-up table may be linearly interpolated, quadratically interpolated, exponentially interpolated, or interpolated using any other suitable mathematical method that would provide a suitable approximate value for the trigonometric function being interpolated. Furthermore, it will be understood that the order in which certain terms are computed may be adjusted to other embodiments of the invention and that a combination of calculation and/or referencing and/or approximation may be used for any or all of the relationships adapted to improve the accuracy of the detected variable. Additionally, it will be understood that other suitable devices may be utilized by a system 80 according to the invention to measure the depth D of water in which a vehicle 10 may be fording. Other optional depth measurement devices that may be suitable for use in the system may be used and the depth measurement provided by one or more of them used in a computation of the distance at which maximum fording depth is likely to be reached or in the computation of the depth D(R) at a horizontal distance R ahead of the vehicle extraction of hydraulic fluids.

Parallel Water Sensors

In one embodiment, the apparatus includes two water level sensors that detect water height at parallel points. This aim can be accomplished through three categories of embodiments. The three embodiments outlined below are not an exhaustive representation of every type of sensor and every different configuration, but rather illustrate the use of the three main categories of embodiments.

One embodiment involves the use of two elongated water sensors, each made of one solid piece that detects the height of water on the surface of the sensor. In this embodiment, the software 110 uses certain known values relating to the position of the two mounted water level sensors to calculate the wading depth ahead of the vehicle. The software 110 must be programmed with the distance between the two mounted water level sensors. Additionally, the angle between every point along with the water level sensors and the outward-facing proximity sensor must be programmed into the software 110. The apparatus uses the water height reading of the two water level sensors to make several calculations enabling the software 110 to subsequently calculate the wading depth ahead of the vehicle.

The first calculation that is made is the angle between the water surface and the water sensors. This angle, in combination with the known angle between the water sensors and the proximity sensors, is treated as an angle in a right triangle. Using this angle, along with the length of the hypotenuse, given by the proximity sensor reading, the processor 121 calculates the base of the triangle, which corresponds to the wading depth ahead of the vehicle. Additionally, the apparatus will determine and display the standing depth of the body of water about or around the apparatus. The height of the apparatus relative to the height of the vehicle is also programmed in processor 121, so only one water level sensor is required to accomplish this.

Examples of the types of sensors that can be used in this (or similar) embodiment include but are not limited to conductive, resistance, capacitance, mechanical or magnetic float sensor, and any combination thereof. This is not an exhaustive list but merely examples of some types of sensors that can be used.

A second embodiment is to use two rows of a series of individual water detection sensors. These parallel series of sensors work by incrementally detecting and tracking the water height as the water moves up and down between each sensor. The software 110 is programmed with the distance between the parallel series as well as the distance between each water detection sensor and the next in its series. The submerged length of each series can be calculated by multiplying the number of submerged detection sensors by the known distance between each of the sensors. It should be noted that the accuracy of this embodiment depends on the density of water detection sensors. That is, the closer the sensors in a series are to each other, the more accurate all subsequent calculations will be. The sensors should be preferably no more than 6 inches apart and more preferably no more than 2 inches apart.

In this embodiment, the software 110 uses certain known values relating to the position of the two-parallel series of water detection sensors to calculate the wading depth ahead of the vehicle. The software 110 may be programmed with the distance between the two series of sensors. Additionally, the angle between every point along with the water level sensors and the downward and outward-facing proximity sensor may be programmed into the software 110.

Examples of the types of sensors that can be used in this (or similar) embodiment include but are not limited to conductive, resistance, optical sensors, and any combination thereof. This is not an exhaustive list but merely examples of some types of sensors that can be used.

In a third embodiment, the apparatus may include two parallel downward-facing proximity sensors in place of the two parallel water sensor arrangements, as discussed in the two embodiments above. This embodiment uses the same mathematical concept, but instead of submerging two physical sensors, or two series of sensors, each proximity sensor transmits and receives a signal from the surface of the ground or medium other than air. The apparatus can compare the signal received from the two proximity sensors and calculate the angle of the vehicle. In this embodiment, the proximity sensors may be set to constantly monitor the surface below the vehicle, they can be set to be activated by a user, or their activation could be set to initiate when the vehicle is placed in a certain operational mode.

In this embodiment, the software 110 uses certain known values relating to the position of the two parallel proximity sensors to calculate the fording depth ahead of the vehicle. The software 110 may be programmed with the distance between the two proximity sensors. Additionally, the angle between parallel proximity sensors and the outward-facing proximity sensor must be programmed into the software 110. If the position of any of the proximity sensors is adjustable, this angle must be continuously tracked Examples of the types of sensors that can be used in this, or similar, embodiment include but are not limited to ultrasonic, laser, and radar proximity sensors, or rangefinders, and any combinations thereof. This is not an exhaustive list but merely examples of some types of sensors that can be used.

Some of the terminology used to describe sensors in this text may differ depending on application despite the sensor being essentially the same and sharing a similar purpose, i.e. proximity sensor and rangefinder. The terms used when describing this apparatus are not meant to limit what elements can be used but rather to provide a basic outline.

Some of the sensors used for the various embodiments are of the same basic types but may be built in different configurations. For example, a conductive water level sensor may, for some applications, be built with a single pin on one side and a series of pins on another that can be used individually to detect the presence of water. Or it could be built in an elongated fashion, with a processor 121 that can measure the rising or falling levels of conductivity, thereby measuring its progression along the wires. It should be noted that operational amplifiers may be necessary for some types of water sensors.

Proximity Sensors

A proximity sensor is mounted to the apparatus underneath the parallel water level sensors, oriented so that the outgoing beam or sound wave moves away from the apparatus at a downward and outward angle toward the submerged surface of the road or ground. The fording depth will be calculated at the point where this beam or wave contacts the ground. The proximity sensor can be activated by the processor 121 when the parallel water level sensors detect the presence of water. The proximity sensor is submerged during its operation.

The position, orientation, and angle of the proximity sensor relative to the parallel water level sensors should be known and tracked by the software 110. Regarding the first and second embodiment of the parallel water sensors described above, the position, orientation, and angle of the proximity sensor relative to these arrangements of parallel water sensors should be known at every point along with the two parallel water level sensors. For all embodiments and configurations of the apparatus, the position, orientation, and angle of the proximity sensor should also be known and tracked in relation to the other elements of the apparatus.

Optionally this invention can utilize a proximity sensor on a motorized turret that can change the angle, thereby extending and decreasing the range of the apparatus. In this case, the software 110 may be programmed to constantly track the changes in angle, relative to the rest of the apparatus and its parallel water level sensors.

The purpose of the proximity sensor in this apparatus is to measure the distance between the apparatus and the ground at an angle. This measurement is used as the hypotenuse of a right triangle whose base corresponds to the depth of the water at the point of the distance between the apparatus and the point at which depth is measured.

The proximity sensor detects the variations in incline and changes in topography ahead of the vehicle. Embodiments of the invention can detect changes in the vehicle's path before the vehicle reaches them. Debris that are detected by the proximity sensor can be identified as such and will not interfere with the ground detection measurements. Possible types of proximity sensors and terms relating to these types of sensors may include but are not limited to a range finder, ultrasonic transducer, sonar, lidar, laser rangefinder, transducer range finder, and any combination thereof.

The Housing/Protective Cover and Mount

Figure 7:
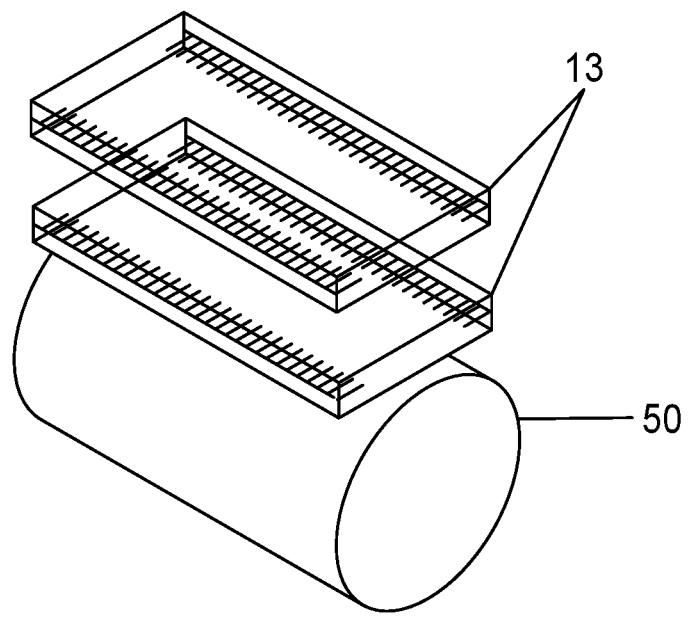
FIG. 7 is a schematic of the water depth sensors and proximity sensor utilizing two parallel series of individual water detection sensors that can be used in embodiments of this invention.
Figure 8:
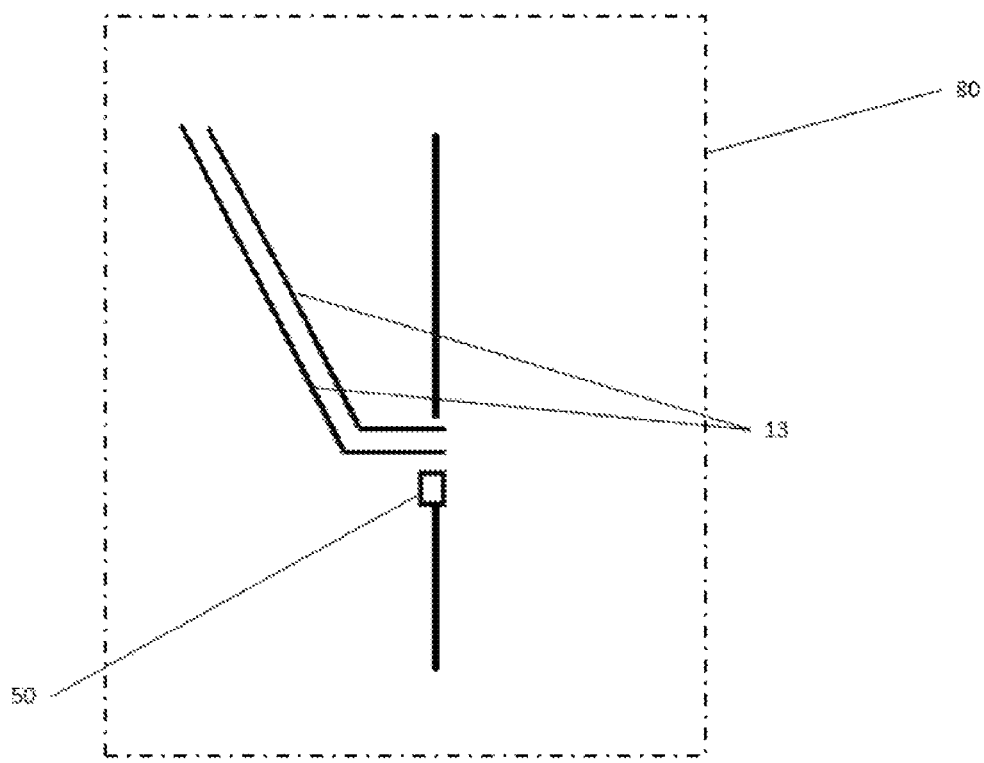
FIG. 8 is a side view of a proximity sensor and water level sensors that can be used in embodiments of this invention.

The proximity sensor is mounted at the bottom of a housing or protective cover that may be tubular and surrounds and secures the parallel water level sensors, as shown in FIG. 7 and FIG. 8. The cover 50 allows water to flow in through the bottom. This allows the water to contact the water level sensors 23 while protecting them from upward overflow caused by the forward momentum of a vehicle. This housing ensures the most accurate water wading depth reading by protecting the water level sensors from fluctuations in the water level, which might otherwise cause the water level sensors to make inaccurate water height measurements. The cover also protects the water level sensors from being damaged by debris, and from making false measurements due to debris.

Optionally, the cover may include a shutter or baffle system at the bottom opening to further limit the flow of water into the housing. Another optional embodiment of the housing is one where a simple shield-like plate is mounted over the sensors which would protect it but allow water to flow freely around the cover from the sides.

Discrete to Digital Converters

The discrete to digital converters 123 may be necessary with certain types of water sensors. For example, the discrete to digital converters 123 may be necessary when the second embodiment of the parallel sensors, employing two parallel series of water detection devices, is used in the apparatus. In this case, using the discrete to digital converters 123 simplifies the processor's calculations and reduces the manufacturing requirements for the processor 121.

In this embodiment, each series of water detection units is connected to a discrete to digital converter 123. The discrete to digital converter 123 counts the units that have detected water and transmit this number to the processer, which uses this information to determine the submerged length of the series. Two discrete to digital converters 123 are used, each one collecting and transmitting data for one of the series of water detection devices. This reduces processing time because the processor 121 receives one number from each of the discrete to digital converters 123 instead of receiving an input from each water detection unit in both series. The discrete to digital converter 123 compartmentalizes the decision process for the processor 121. Each discrete to digital converter 123 can count the number of submerged sensors in its series and relay this information to the processor 121.

Processor

Figure 11:
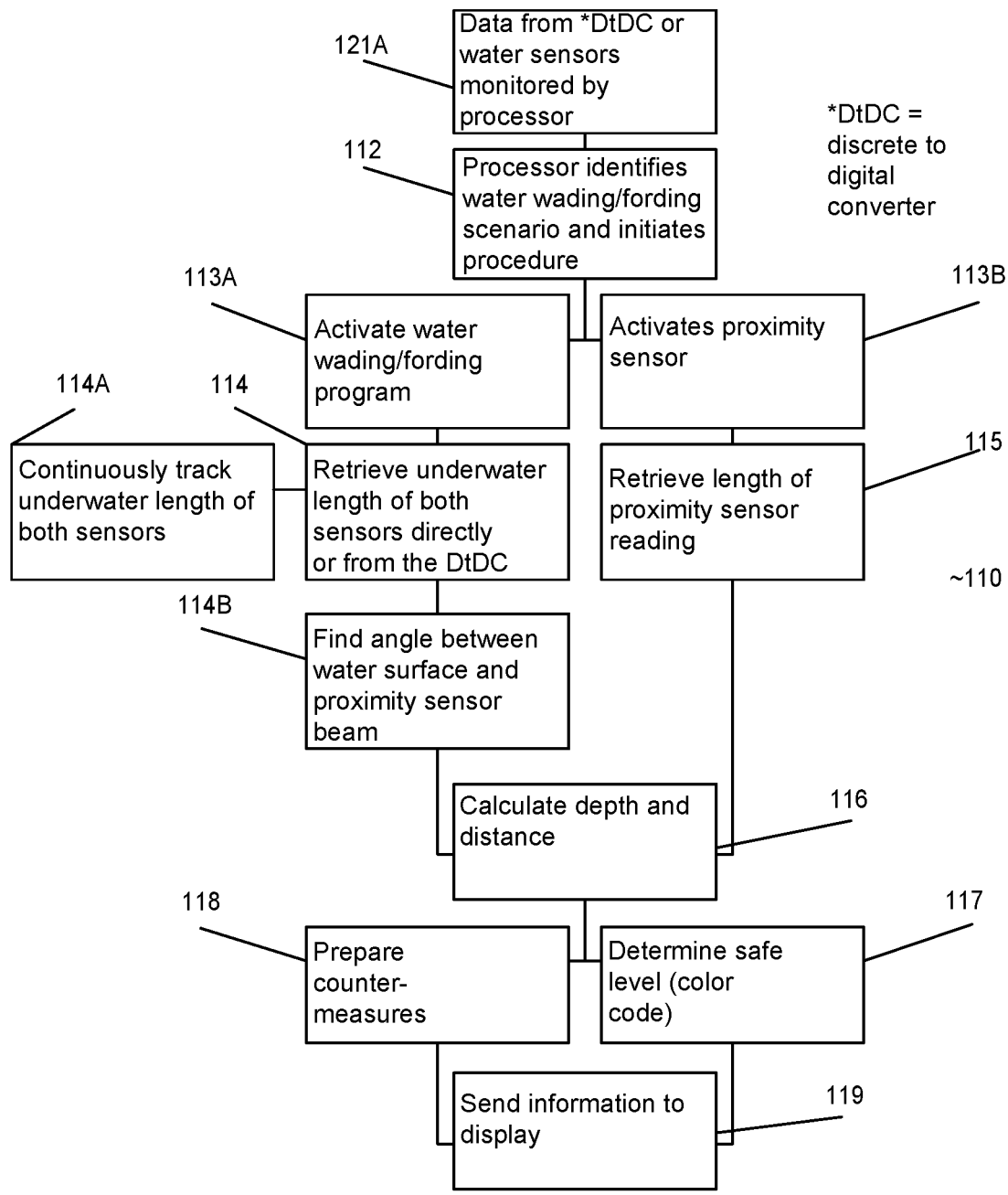
FIG. 11 is a software flow chart for the control unit.

In most embodiments, a processor 121 is needed for the apparatus, as the functions of the apparatus may include calculating trigonometric equations, storing information about the vehicle to be used by the software 110, as shown in FIG. 11, and deciding and displaying recommendations such as driving speeds or safety levels. For certain uses and applications, such as driving through water in a vehicle (water wading/fording), the processor 121 enables sending alerts to the display 122, allowing the user to monitor safety levels by audio or visual alerts. A color-coding system indicating safe levels can also be used. For example, certain levels and readings might be displayed in green to indicate safe levels, where the depth is well below the maximum water threshold, yellow values might indicate a depth nearing the maximum threshold, where the user should proceed with caution, and red might indicate that the depth exceeds the maximum threshold and that the user should not proceed.

Inventive embodiments provide an advantage over other systems because it can detect water depth at a further maximum range ahead of the vehicle's path. Embodiments of this invention can give a vehicle's onboard computer system further advance warning to prepare automated countermeasures and/or allow a user to implement manual countermeasures or maneuvers. For this reason, the processor 121 should be programmed with the necessary information relating to the specific vehicle to make its recommendations and produce a relevant output for a vehicle's computer system and display 122.

Maximum safe fording depth can be an important metric for the apparatus when it is used in certain applications, such as on a vehicle for water wading/fording. For applications such as these, this information enables the processor 121 to make its recommendations and to prepare and relay safety and warning information.

Vehicle-specific information, such as the height and location, in relation to the ground, of a vehicle's air intake, exhaust tailpipe, and exposed electronic components may be stored in the processor 121 so that the processor 121 can make relevant determinations of safe wading depth for a given vehicle. Depending on the situation and nature of the vehicle, any combination of the above vehicle-specific information, as well as other unmentioned information, may be needed. Alternatively, it is possible, though not recommended, to omit vehicle-specific information in the programming of the processor 121, rather allowing the user to determine the safety of the water fording scenario based on the information about the depth ahead.

For the invention's processor 121 to perform the preferred calculations, the position, location, and orientation of the various water sensor components 125 may need to be stored in the processor 121. This information may be made available to the software 110 to be used in its calculations. In various situations, only certain information may be needed, while in other situations all or different information may be needed.

Depending on which of the three embodiments of parallel sensors are used, the sensors might communicate with the processor 121 in different ways. When two solid elongated parallel sensors are being used, these sensors can transmit their readings directly to the processor 121 for subsequent use in calculations. This is also true of the sensor embodiment employing to parallel proximity sensors. However, when two series of water detection sensors are used, it is advantageous to use discrete to digital converters 123 as an intermediary. The discrete to digital converters 123 are connected through input to the multitude of detection sensors 125. They interpret the information from each water detection device, then through an output, they send the final number of submerged detection units on each series to the processor 121. The software 110 protocols, and the processor 121 inputs and output outlets, will differ depending on which sensor embodiment and which specific type of sensor is used.

A proximity sensor is mounted to the apparatus underneath the parallel water level sensors. This proximity sensor is orientated so that the outgoing beam or sound wave or sonar 127 moves away from the apparatus at a downward angle, toward the ground under the body of water. The water depth is calculated at the point where the beam or wave contacts the ground.

The proximity sensor or water sensor 125 is activated by the processor 121 when the parallel water level sensors detect the presence of water. Therefore, the proximity sensor is only activated once it is submerged. The proximity sensor's position, orientation, and angle relative to every point along the parallel water level sensors should be known and tracked by the processor 121 and its software 110 as the apparatus progresses into and through the water.

As mentioned above, the movement of the submerged proximity sensor should be tracked. In an optional embodiment, the invention can utilize a proximity sensor on a motorized turret that can adjust the proximity sensor's angle, thereby extending the range of the apparatus. In this case, the processor 121 and it's software 110 must constantly track and store the dynamic angle relative to the other components of the apparatus, specifically to its parallel water level sensors.

The processor 121, and its software 110, can determine the angle of the apparatus with respect to the water surface and the angle of the submerged proximity sensor concerning the water surface through geometric and trigonometric relationships. The submerged lengths of each of the parallel water sensors are used as the variables in the calculations of these angles. The submerged lengths of each of the two sensors form two sides of a right-angle trapezoid and the distance between the two sensors forms the base of the trapezoid. Using simple geometric calculations, the software 110 calculates the remaining angles of the trapezoid, one of which (depending on the embodiment of the apparatus) is equivalent to the angle between the water surface and the parallel sensors. The angle just calculated can be combined with the known angle between the submerged proximity sensor and the parallel water detection sensors to obtain the total angle between the proximity sensor beam or wave and the water surface.

The beam or wave emitted by the submerged proximity sensor forms the hypotenuse of a right triangle (or a portion of the hypotenuse depending on the placement of the submerged proximity sensor within the apparatus). Embodiments of this invention use the angle between the proximity sensor output and the surface of the water as one of the acute angles of the same right triangle. With the length of the hypotenuse and this angle, the software 110 can calculate the length of the base of this right triangle and the length of the unknown leg of this right triangle, corresponding to the depth of the water ahead of the vehicle and the distance at which that depth is calculated respectively. In the case that the submerged proximity sensor is held at a fixed angle relative to the parallel water sensors, the distance from the vehicle at which depth is calculated varies with the incline of the road.

In the case that the submerged proximity sensor is attached to a motorized turret, the distance from the vehicle at which wading depth is calculated can selectively choose to be varied or set to a constant value. If it is desirable for the distance at which depth is measured to remain constant, this could be accomplished through iterations. These iterations would be accomplished by taking several proximity sensor readings and subsequent calculations at different angles (accomplished by movements of the motorized turret) in rapid succession. The turret would then return the submerged proximity sensor to the angle at which depth was measured at the preset desired distance ahead of the vehicle. In prior art references that share certain similarities with the invention, the distance at which depth is estimated is held constant for every situation, which is a significant limitation.

Display

The invention includes a display 122 that provides the user with three important numbers: the depth around or about the apparatus and vehicle, the depth ahead of the apparatus, and the distance between the vehicle and the depth. As the apparatus moves forward along a path for example if mounted to the front of a vehicle, the numbers can automatically update and change as the path changes and the apparatus detects new readings.

The measurements may be presented in varying units such as inches, centimeters, feet, or meters. The measurements may be rounded to the nearest integer or may be displayed to the nearest specified decimal value. In an alternative embodiment, display 122 can represent the measurements as fractional or percentage values of the maximum safe wading depth. For example, if the maximum wading depth for a particular vehicle is 2 feet (ft) and the apparatus calculates a depth of 1 ft ahead of the vehicle, display 122 would show 50% of maximum safe wading depth.

In another embodiment, display 122 could represent the desired measurements as distances from the maximum safe wading depth. For example, if the maximum wading depth for a particular vehicle is 2 ft and the apparatus calculates a depth of 1 ft ahead of the vehicle, display 122 would show 1 ft from maximum safe wading depth.

Color coding to indicate safety levels may be used in display 122. For example, the depth around or about the apparatus may be displayed as green when a vehicle first enters a body of water to indicate that the current water depth is at a safe level and does not exceed the maximum wading/fording threshold. The depth ahead may be displayed in the same color or a different color such as yellow, which may indicate to a driver that the water depth ahead of the vehicle comes close to the maximum wading/fording threshold, or red, which may indicate that the water ahead exceeds the vehicle's maximum wading/fording threshold. Display 122 might also show pop up warnings relating to the depth ahead of the vehicle, such as "Proceed with caution!" or "Do not proceed!" Depending upon the calculations. In addition to, or instead of, a color-coding system.

How information is displayed can vary widely. In one embodiment, display 122 can consist of numerical values with minimal descriptive text. For example, display 122 might show the following: Depth: 00, Depth Ahead: 00, Distance: 00. In another embodiment, display 122 may include an animated representation or image of a vehicle and any amount of area surrounding the vehicle, with the numerical values superimposed on the screen. Some possible versions of this embodiment could show the vehicle in a side view, bird's eye view, or some perspective of the path ahead. In an optional embodiment, the apparatus may share a display 122 with an existing onboard computer or "infotainment system", where access to the apparatus functions may be automatic upon detection of water or manually selected through the "infotainment system" menu.

In another embodiment, the apparatus may be connected, through a wireless, Bluetooth, or wired connection, to a user's smartphone, tablet, computer, or another device. In this case, the apparatus would be used without a dedicated display. The above descriptions are not an exhaustive list of all display possibilities and are intended as examples of some of the possibilities.

Power Source

The apparatus may include its own power source, or it may be connected to a shared power source. An example of a shared power source might be a dedicated power source on a vehicle, or a power cord that can be plugged in to a vehicle other device.

Method of Manufacturing

Considerations for manufacturing the housing or protective cover and mounting system may depend on the length of the apparatus components, including the length of the parallel water sensors. The length of the apparatus and its components will depend on the particular application of the apparatus, and if it is mounted on a vehicle, then the vehicle type will also impact this length. For example, the parallel water sensors, and the housing, might be longer when configured for a pickup truck or SUV than when configured for a sedan. These components might be longer still when configured for use in a large cargo truck or emergency vehicle, such as a fire engine.

The design and size of the housing and mount would also vary based on the embodiments of the various components. For example, if the embodiment of the parallel sensors employing two parallel mounted proximity sensors is used, the housing/mount would differ from that used with two elongated water sensors. For example, certain types of optical sensors may require more space than a conductivity sensor that uses very thin wire or pins as probes to sense water.

Certain aspects of manufacturing would be adjusted if it is necessary or desirable, for a particular application, to mount the apparatus underneath the hood of a vehicle. In this case, the shape of the sensor array may vary depending on the internal components of the vehicle that the apparatus needs to accommodate, such as the radiator, electrical components, and air, gas, and fluid tubes.

Optionally, a possible method of manufacturing the parallel sensor embodiment utilizing two series of individual water detection sensors is to embed each of the water detection sensors into an elongated plate made of flexible polymer. The wiring for each sensor would also be embedded into the polymer plate. The housing for the two resulting plates would be designed to fit a particular vehicle or class of vehicles. The housing can be designed with two parallel cavities with rigid rails to guide the insertion of the flexible polymer plates. During assembly, the flexible polymer plates would be inserted into the cavities with the aid of the guiding rails. The plates could then be easily pushed into the proper position within the housing then secured. The central advantage of this method is it would allow for simplified manufacturing, as the flexible plate would conform to any housing shape.

Installation

When mounted to a vehicle, the apparatus may be mounted underneath the hood, between the radiator and the front vent (or "grill"). The angle and position of the apparatus must be determined based on the make and model of the vehicle. Stabilizing brackets, secured by screws, magnets, tension, or other brackets, may attach the apparatus to the frame of the vehicle. Optionally, it may be possible to configure size and shape that would fit the majority of vehicles. It may also be possible to configure size and shape to fit most vehicles in a given category. For example, there might be a "one size fits most" option for sedans and another for SUVs.

To mount the apparatus to a vehicle, the center of the lowest part of the bumper may have to be modified to accommodate the proximity sensor and the front of the housing that holds the two rows of water level sensors. This modification may be necessary to allow water to contact the water detection sensors and to allow the proximity sensor to emit its beam or wave in an uninterrupted path ahead of the vehicle.

The wiring may be routed from the mounting point of the apparatus at the front of the vehicle to the display 122 and computer in the cab of the vehicle. If an embodiment of the apparatus is being used where an independent display 122 and or processor 121 is utilized, then the power for both the display 122 and the remainder of the apparatus can be drawn from the 12 volts (v) plug standard in most vehicle. Alternatively, a wireless component can be added to the apparatus processor 121 in the front of the vehicle, and the various readings, warnings, and recommendations can be sent to the display 122 via a wireless connection, such as Bluetooth, Wireless local area network, etc.

Other Applications

Although the primary focus of this document has been the use of the apparatus in a vehicle during a water fording/wading event, there are multiple other applications for the invention/apparatus.

Boats

In an alternative embodiment, the invention can be used as a low-cost, portable device for boats. Though there exist other advanced (and expensive) sonar imaging systems/devices for measuring depths and underwater topography, this invention could prove a useful tool. For example, the invention would be useful in situations where an aquatic pilot wants to find the depth of multiple locations in a body of water from a single location.

Surveying

In another embodiment, the apparatus may be used for surveying. The apparatus may be used as a tool to aid in the planning of underwater land clearing and modifications of lakes, ponds, and rivers for residential or commercial use.

Boat Launch Aid

In a novel embodiment, the apparatus may be placed on the rear of a vehicle to aid in a boat launch scenario. In this embodiment, the user reverses a vehicle and its attached boat and trailer down a ramp, or inclined edge of the body of water, until the appropriate portion of the boat is in contact with the water. This is a somewhat complex maneuver. It would be beneficial to receive a calculated reading that the rear of the boat trailer has reached the desired depth and that the boat is at the required depth to initiate a launch.

In an alternative embodiment for the same application, the apparatus may be located on the forward part of a boat trailer facing the rear. The underwater proximity sensor is aimed at the ground directly below the point on the boat where it is most important that water depth be known when launching.

In an optional embodiment of the apparatus, an additional proximity sensor can be installed facing directly at the ground to measure the height of the remaining apparatus components. This embodiment would aid in the self installation of the apparatus on a trailer or other vehicle, and would serve to eliminate the need to program the apparatus with vehicle specific height and other information.

Example

While various embodiments usable within the scope of the present disclosure have been described with emphasis, it should be understood that within the scope of the appended claims, the present invention can be practiced other than as specifically described herein. It should be understood by persons of ordinary skill in the art that an embodiment of the apparatus, method, system, and vehicles following the present disclosure can comprise all of the features described above. However, it should also be understood that each feature described above can be incorporated into the apparatus, method, system, and vehicles by itself or in combinations, without departing from the scope of the present disclosure.

The processor 121, and it's software 110, determines the angle of the apparatus with respect to the water surface and the angle of the submerged proximity sensor with respect to the water surface through geometric and trigonometric relationships. The submerged lengths of each of the parallel water sensors are used as the variables in the calculations of these angles. The submerged lengths of each of the two sensors form two sides of a right-angle trapezoid and the distance between the two sensors forms the base of the trapezoid. Using simple geometric calculations, the software 110 calculates the remaining angles of the trapezoid, one of which (depending on the embodiment of the apparatus) is equivalent to the angle between the water surface and the parallel sensors. The angle just calculated can be combined with the known angle between the submerged proximity sensor and the parallel water detection sensors to obtain the total angle between the proximity sensor beam or wave and the water surface.

The beam or wave emitted by the submerged proximity sensor forms the hypotenuse of a right triangle (or a portion of the hypotenuse depending on the placement of the submerged proximity sensor within the apparatus). The invention uses the angle between the proximity sensor output and the surface of the water as one of the acute angles of the same right triangle. With the length of the hypotenuse and this angle, the software 110 calculates the length of the base of this right triangle and the length of the unknown leg of this right triangle, corresponding to the depth of the water ahead of the vehicle and the distance at which that depth is calculated respectively.

Following is the mathematical method for determining depth and distance in one embodiment. While the principles illustrated in this case apply to all embodiments, many aspects of the calculations would vary depending on the embodiment of the parallel water sensors, the embodiment of the submerged proximity sensors, and the placement and arrangement of all aspects of the apparatus.

Figure 10:
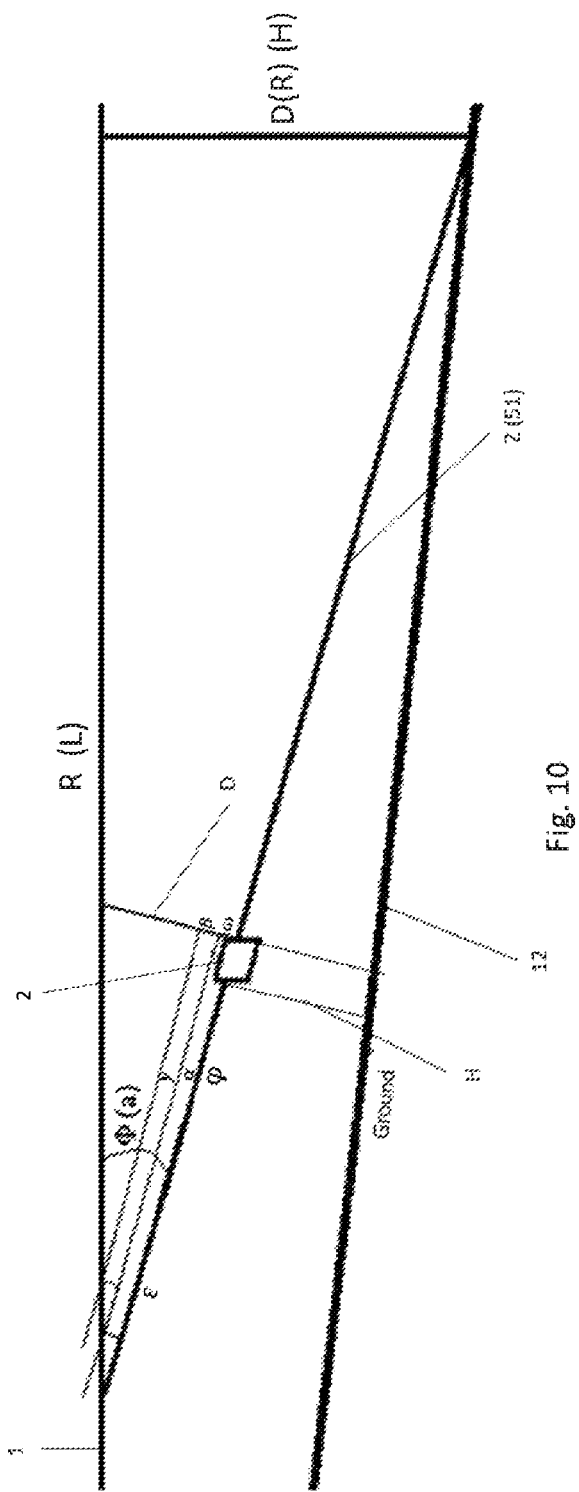
FIG. 10 is an illustration of how the water surface angle and calculated depth of water is measured and distance to point where depth is measured.

A visual representation of this embodiment and its variables can be found in FIG. 10 and can be understood using the following algorithm.

The submerged length of sensor 1 equals $\gamma$. The submerged length of sensor 2 equals $\alpha$. The distance between the two sensors equals $\beta$. The distance between sensor 2 and the proximity sensor equals $\omega$.

D, equaling the unknown edge of the trapezoid formed with the submerged portions of the two sensors as the edges, is found with the formula $D=\sqrt{(\alpha-\gamma)^2+\beta^2}$ Φ, equaling the acute angle of the trapezoid and the angle between the proximity sensor and the water surface, is found with the formula $\Phi=90°-\arccos(((\beta^2+D^2-(\alpha-\gamma)^2)/(2*\beta*D))$ A right triangle is conceived, with base equal to w and height equal to ε. ε is found with the formula $\varepsilon=w/\tan(\Phi)$.

Let ε+α=φ. φ is a new variable that represents the distance between the edge of the vehicle and the initiation point of the ultrasonic beam Let z equal the length of the ultrasonic beam, and Z=z+φ.

Let H equal height or depth of the water. H is found with the formula $H=Z(\sin(\Phi))$ Let L equal the distance from the vehicle at which depth is calculated. L is found with the formula $L=Z(\cos(\Phi))$ The software 110 as seen in FIG. 11, held on the processor 121 initiates its calculation program 112 upon detecting a signal 113 from the water level sensors or the discrete to digital converters 123. This signal is transmitted 113*a* when water sensors indicate that water levels surrounding the apparatus have covered the submerged proximity sensor 113*b*. Upon initiation, the procedure program for water wading/fording, which includes two concurrent chains 114, 115, proceeds. The purpose of the first chain 114 is to retrieve the submerged length of each of the parallel water sensors, either directly or through the discrete to digital converters 123, and to continuously track, record, and store this length as the apparatus continues to travel through the water 114*a*.

This information is used to determine and continuously monitors the angle between the apparatus and the surface of the water 114*a*. The purpose of the second chain 115 is to activate the submerged proximity sensor and retrieve its numerical length output. The outputs 116 of the two chains 114, 115 are used to calculate the depth ahead of the apparatus, and the distance at which this depth is measured. The software 110 assesses how the calculated depth and distance compared to the maximum safe wading levels 117 for the relevant vehicle (or other particular application of the apparatus) and initiates automatic countermeasures 118 (if applicable). The software 110 determines what warnings, suggestions, color-coding, etc. (dependent upon display embodiment) are to be sent to display 122, and then relays the output 119 of its processes to display 122.

Figure 9:
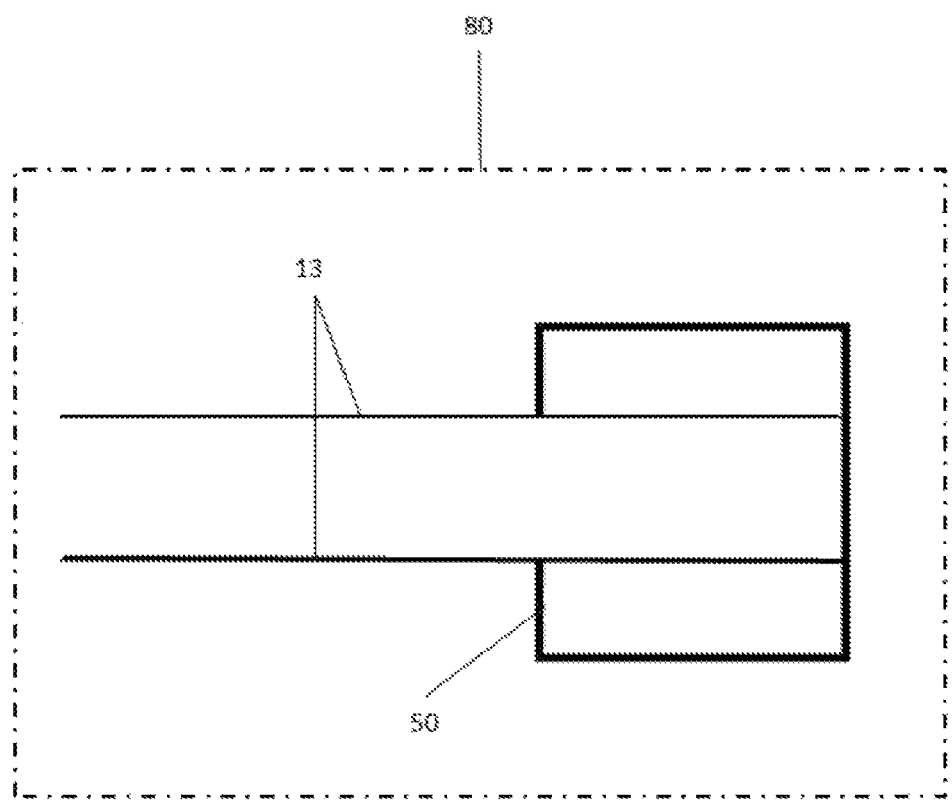
FIG. 9 is a top view of a proximity sensor and water level sensors that can be used in embodiments of this invention.
Figure 12:
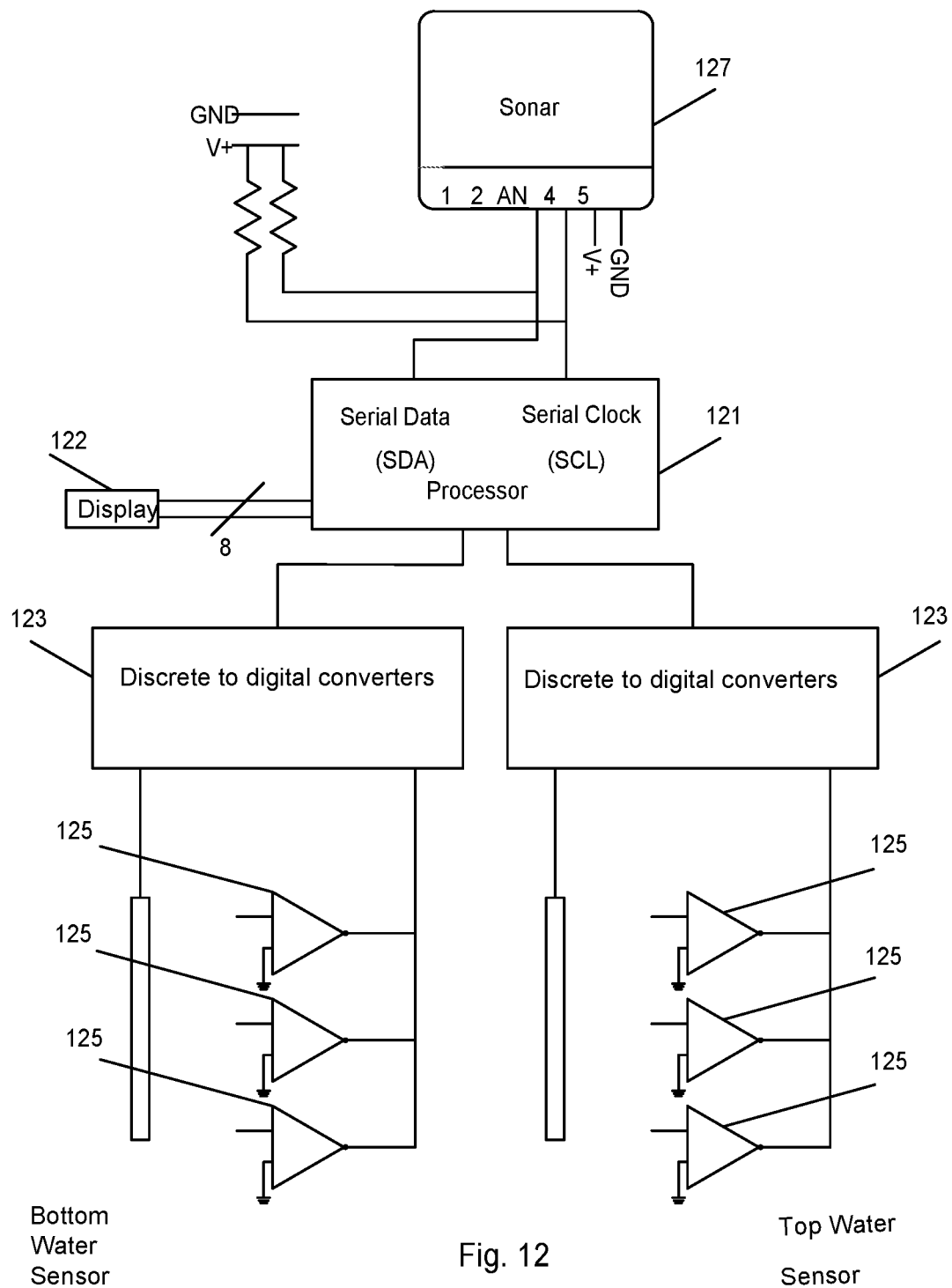
FIG. 12 is an electrical schematic of the system.

FIG. 12 shows one embodiment of an electrical schematic 120 of the system 80 including but not limited to electronic devices such as sensors 13, 50, in FIG. 8, and FIG. 9, discrete to digital converters 123, wiring, processor 121, displays 122, etc. The electrical system of system 80 may include other electrical components not shown in schematic 120. The system 80 may have variations of the electronic schematic 120 having different layouts by adding or deleting electronic devices or by changing the connections between the various electric components. The electronic schematic in FIG. 12 is but one embodiment of a schematic that may be used in system 80.

What is claimed is:

1. A method comprising:
    a. receiving a signal from at least three sensors with at least two types of sensors at a first sensor location, and at least two proximity sensors that are parallel, wherein a portion of the at least three sensors are located on the front half of the vehicle indicating presence of water, first water fording depth at the first sensor location on the vehicle, and at least one proximity sensor to determine road angle ahead of the vehicle, wherein the at least one proximity sensor is designed to operate underneath the water surface;
    b. receiving a signal from a second sensor indicating second water fording depth at the second location on the vehicle to determine attitude of the vehicle and the angle of the road ahead; and
    c. detecting based upon comparing the angle between the first current water fording and the second current water fording depth, attitude of the vehicle and the angle of the road ahead and a distance in advance of the location of the vehicle and/or a maximum wading depth of the vehicle, a depth of water at a location ahead of the vehicle substantially in the direction of vehicle movement and/or the distance, ahead of the vehicle substantially in the direction of vehicle movement, to determine future maximum fording depth.

2. A method of claim 1, wherein the detecting is carried out in dependence on detecting the presence of water at least partially about the front of the vehicle by receipt of a signal indicating fording and dependence on detecting the attitude of the vehicle by receipt of a signal indicating attitude compared to the water level and determining depth of the water by determining how much of the water sensors are submerged under the water surface.

3. The method of claim 1, comprising continually tracking the depth of water whilst the vehicle is moving and fording is detected and displaying the depth of the water and determining inclination of the vehicle by comparing at least two water level sensors that are submerged.

4. The method of claim 1, wherein the at least one proximity sensor is underneath at least two parallel water sensors and further comprising using a processor to compare the angle between the first current water fording and the second current water fording depth, an attitude of vehicle and the angle of the road ahead and a distance in advance of the location of the vehicle and/or a maximum fording depth of the vehicle, a depth of water at the location ahead of the vehicle substantially in the direction of vehicle movement and/or the distance, ahead of the vehicle substantially in the direction of vehicle movement, to determine future maximum fording depth.

5. The method of claim 4, further comprising using the processor to brake the car before the car enters water above a predetermined depth and activating the at least one proximity sensor when at least one of the at least two parallel water sensors detect water.

6. The method of claim 1, comprising calculating the fording depth ahead of the vehicle by position of the at least two parallel proximity sensors and calculating depth of water to the vehicle driver.

7. The method of claim 1, comprising determining submerged length of each of the at least two parallel water sensors to continuously monitor angles between the at least two parallel water sensors and the water surface and calculating the distance of vehicle movement to maximum fording depth, and indicating the distance to the vehicle driver.

8. A vehicle comprising:
    a. a fording depth sensor;
    b. a second fording depth sensor;
    c. at least two proximity sensors, wherein the at least two proximity sensors are parallel, to determine road angle or position ahead of the vehicle, wherein at least one proximity sensor is designed to operate underneath the water surface; and
    d. a control unit configured to use signals of the fording depth and sensors to compute a fording depth at a location ahead of the direction of vehicle movement and/or to compute a distance ahead of the direction of vehicle movement to maximum fording depth.

9. The vehicle of claim 8, further comprising a sensor for indicating fording and wherein the control unit determines depth of the water by determining how much of the water sensors are submerged under the water surface.

10. The vehicle of claim 8, wherein the control unit is configured to calculate fording depth only upon detection of fording and determining inclination of the vehicle by comparing at least two water level sensors that are submerged.

11. The vehicle of claim 8, wherein the control unit is configured to detect fording depth and wherein at least one proximity sensor is underneath the at least two parallel water sensors.

12. The vehicle of claim 11, further comprising at least two parallel water sensors, wherein the control unit is adapted to calculate or detect a distance to maximum fording depth, and to indicate the distance to the vehicle driver and activating the at least one proximity sensor when at least one of the at least two parallel water sensors detect water.

13. The vehicle of claim 8, further comprising a sensor for indicating fording adjacent a front perimeter thereof in the direction of movement and calculating the fording depth ahead of the vehicle by position of the at least two parallel proximity sensors and the sensor for indicating fording adjacent a front perimeter thereof in the direction of movement.

14. The vehicle of claim 8, further comprising a display for showing the depth of the water at vehicle's location and a location in front of the vehicle and determining submerged length of each of the at least two parallel water sensors to continuously monitor angles between the at least two parallel water sensors and the water surface.

15. A system for a vehicle, the system comprising:
  a. a control unit;
  b. fording depth sensor;
  c. a second fording depth sensor to determine angle in water and angle relating to the proximity sensor; and
  d. at least two proximity sensors, wherein the at least two proximity sensors are parallel, to determine road angle ahead of the vehicle, wherein the control unit is configured to determine fording depth in advance of a location of a vehicle and configured to estimate a maximum range of a vehicle in advance of a location of a vehicle, wherein the maximum range is based upon a fording depth as determined by the fording depth sensor, tilt as determined by comparing water level sensors and a distance in advance of the location of the vehicle and a maximum fording depth of the vehicle, and wherein at least one proximity sensor is designed to operate underneath water surface.

16. The system of claim 15, further comprising a computer configured to carry out the calculations of a depth of water at a location ahead of the direction of vehicle movement and/or calculating the distance ahead of the direction of vehicle movement to maximum fording depth and wherein the control unit determines depth of the water by determining how much of the water sensors are submerged under the water surface.

17. The system of claim 15, further comprising an audio alert and further comprising at least two water sensors for determining inclination of the vehicle by comparing at least two water level sensors that are submerged.

18. The system of claim 16, wherein the computer is configured to activate the vehicle's brakes before the vehicle enters a predetermined depth of water further comprising at least two parallel water sensors, wherein at least one proximity sensor is underneath the at least two parallel water sensors.

19. The system of claim 18 wherein, the computer is configured to detect presence of water ahead of a vehicle, calculate a first depth of water using vehicle fording depth sensor, a second fording depth sensor, and the proximity sensor to determine road angle ahead of the vehicle; and using information from the fording depth to calculate a second depth of water at a location ahead of the vehicle in the direction of vehicle orientation and activating the at least one proximity sensor when at least one of the at least two parallel water sensors detect water.

20. The system of claim 15 further comprising further a display for showing depth of water at vehicle's location and a location in front of the vehicle and calculating the fording depth ahead of the vehicle by position of the at least two parallel proximity sensors.

* * * * *